United States Patent [19]
Waddill et al.

[11] Patent Number: 5,241,016
[45] Date of Patent: Aug. 31, 1993

[54] EPOXY ADHESIVES CONTAINING AMINATED, LONG CHAIN MONOEPOXIDE CAPPED POLYOLS

[75] Inventors: Harold G. Waddill; Robert A. Grigsby, Jr.; Michael Cuscurida; Robert L. Zimmerman, all of Austin, Tex.

[73] Assignee: Texaco Chemical Company, White Plains, N.Y.

[21] Appl. No.: 889,879

[22] Filed: May 29, 1992

[51] Int. Cl.$^5$ .................. C08G 59/40; C08G 59/62; C08G 65/00; C08G 65/32

[52] U.S. Cl. .................. 525/407; 525/404; 525/423; 525/504; 525/523; 525/530; 525/533; 525/535; 528/94; 528/103; 528/111; 528/341; 528/361; 528/374; 528/407

[58] Field of Search ............. 525/407, 504, 404, 523, 525/423, 533, 535, 530; 528/103, 111, 361, 374, 341, 407, 94

[56] References Cited

U.S. PATENT DOCUMENTS

| | | | |
|---|---|---|---|
| 3,654,370 | 4/1972 | Yeakey | 544/162 |
| 3,730,908 | 5/1973 | Harvey | 528/111 |
| 5,191,033 | 3/1993 | Cuscurdia et al. | 525/504 |

Primary Examiner—Frederick F. Krass
Attorney, Agent, or Firm—Jack H. Park; Kenneth R. Priem; Richard A. Morgan

[57] ABSTRACT

The invention is an epoxy resin adhesive composition. The composition comprises:
A. An epoxy resin component; and
B. A curative component comprising:
 a curing amount of a polyamine curing agent and 2 to 30 phr. of an adhesion enhancer of comprising a partially hindered polyetherpolyamine.

The fast curing adhesive offers high lap shear strength and relatively high peel strength.

6 Claims, No Drawings

EPOXY ADHESIVES CONTAINING AMINATED, LONG CHAIN MONOEPOXIDE CAPPED POLYOLS

CROSS REFERENCE TO RELATED APPLICATION

This application is related to Ser. No. 07/865,170 filed Apr. 8, 1992 for use of Hindered Amines to Slow Down Reactivity In Produce RIM Elastomers to R. A. Grigsby, Jr. et al.

BACKGROUND OF THE INVENTION

Field of the Invention

This invention relates to an epoxy resin adhesive formulation.

Description of Other Relevant Materials in the Field

Epoxy resins constitute a broad class of polymeric materials having a wide range of physical properties. The resins are characterized by epoxide groups which are cured by reaction with certain catalysts or curing agents to provide cured epoxy resin compositions with certain desirable properties.

The most common epoxy resins are a condensation product of epichlorohydrin and bisphenol A. These resins can be cured with conventional curing agents such as polyamines, polycarboxylic acids, anhydrides and Lewis acids. Bisphenol A based epoxy compositions when cured have good adhesive properties but many are inherently stiff and brittle and hence their use is limited to applications where peel forces are not significant.

It has been found that plasticizers can be added to an epoxy resin adhesive system to improve flexural strength. Typical methods of plasticization include the addition of flexibilizing aliphatic amines to the curing agent, addition of aminated or carboxylated rubbers to the system, addition of carboxy-terminated polyesters, addition of organic hydroxyl containing compounds and the addition of epoxidized oils.

H. N. Vazirani *Adhesives Age* 23, No. 10, p. 31 describes reaction products of liquid epoxy resins with a polyoxypropylene diamine which are useful in flexibilizing adhesive systems.

There is a need in the art for an epoxy system that produces a flexible cured resin with good adhesive properties.

A process for preparing polyoxyalkylene polyamines is described in U.S. Pat. No. 3,654,370 to Yeakey. This patent describes curing agents for epoxy resins of the formula

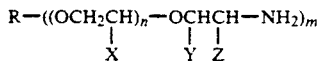

wherein R is the nucleus of an oxyalkylation susceptible polyhydric alcohol containing 2 to 12 carbon atoms and 2 to 8 hydroxyl groups, Z is an alkyl group containing 1-18 carbon atoms, X and Y are hydrogen or Z, n has an average value of 0 to 50 and m is an integer of 2 to 8 corresponding to the number of hydroxyl groups in the polyhydric alcohol.

U.S. Pat. No. 3,236,895 to J. M. Lee and J. C. Winfrey and U.S. Pat. No. 3,462,393 to Legler are pioneer patents. They describe a series of amine compounds which are solids or liquids and have utility particularly in curing epoxy resins. The amine compounds have the general formula:

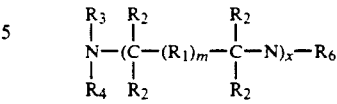

wherein Rs are selectively defined as hydrogen, alkyl radicals and alkylene oxide radicals and x and m are defined integers.

U.S. Pat. No. 4,528,345 to H. G. Waddill teaches a method for making weather-resistant epoxy coatings. The method comprises prereacting a cycloaliphatic diepoxide resin with aminoethylpiperazine or a mixture of aminoethylpiperazine and polyoxyalkylenepolyamine in an amount which is balanced to give the maximum level of primary amine reaction without yielding an excessively viscous reaction product. The prereacted product is reacted with a curing amount of a polyoxyalkylenepolyamine and an accelerator.

U.S. Pat. No. 3,875,072 to H. G. Waddill teaches an accelerator for curing epoxy resins. The accelerator comprises piperazine and an alkanolamine in a weight ratio of 1:8 to 1:1.

U.S. Pat. No. 4,195,153 to H. G. Waddill teaches a non-crystallizing accelerator for curing epoxy resins. The accelerator comprises a mixture of N-aminoethylpiperazine and triethanolamine.

U.S. Pat. No. 4,189,564 to H. G. Waddill teaches a non-crystallizing accelerator for curing epoxy resins. The accelerator comprises a mixture of piperazine, N-aminoethylpiperazine and triethanolamine. The product comprising 65 to 80 wt % triethanolamine, 10 to 20 wt % piperazine and 5 to 10 wt % N-aminoethylpiperazine is sold commercially as Accelerator 399 by Texaco Chemical Co. The accelerator is syngergistic for accelerating the curing of a polyglycidyl ether of a polyhydric phenol cured with a polyoxyalkylene polyamine at ambient or elevated temperatures. Such amines include polyoxypropylene diamines of the formula:

wherein x ranges from 2 to 40.

These diamines may be synthesized according to U.S. Pat. No. 3,654,370 to E. L. Yeakey which teaches a method comprising a nickel, copper and chromium catalyst for aminating polyols. These diamines were originally taught in U.S. Pat. No. 3,462,393 to Legler.

U.S. Pat. No. 3,496,138 to R. F. Sellers and C. F. Pitt teaches curing diepoxides with polyglycol diamines. Suitable glycol precursors to these diamines include ethylene glycol, diethylene glycol and polyethylene glycol.

SUMMARY OF THE INVENTION

The invention is an epoxy resin composition. The epoxy resin component comprises a vicinal polyepoxide having an average of at least 1.8 reactive 1,2-epoxy groups per molecule.

The curative component comprises a curing amount of: (1) a polyamine curing agent and (2) 2 to 30 parts per hundred parts vicinal polyepoxide of a hindered polyetherpolyamine adhesion enhancer. The hindered polyetherpolyamine is obtained by reacting a polyol having two or more hydroxyl groups with an effective amount of long chain alkyl epoxide to give an at least partially hindered intermediate having hydroxyl terminations; and then aminating at least some of the hydroxyl terminations on the intermediate to primary amine groups to give an at least partially hindered polyetherpolyamine.

This system demonstrates a rapid cure, high lap shear strength and relatively high peel strength. These properties are effective for use as adhesives. The adhesion enhancer has a preferred molecular weight of 3000 to 5000.

DESCRIPTION OF THE PREFERRED EMBODIMENTS

An epoxy adhesive formulation has been discovered which demonstrates rapid cure, high lap shear strength and relatively high peel strength. The formulation comprises liquid epoxy resin, a polyamine curing agent and an adhesion promoting composition.

Generally the vicinal polyepoxide containing compositions which may be cured with the products of the invention are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic and may be substituted if desired with other substituents besides the epoxy groups, e.g., hydroxyl groups, ether radicals, aromatic halogen atoms and the like. These vicinal polyepoxide containing compounds typically are of an epoxy equivalent weight of 150 to 250. Preferably the base resin, which has an epoxide equivalent weight of from 175 to 195, is derived from condensing epichlorohydrin with 2,2-bis(p-hydroxyphenyl propane) to form 2,2-bis[(p-2,3 epoxy propoxy)phenyl] propane, a derivative of bisphenol A.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolac, resorcinol, etc. The epoxy derivatives of methylene or isopropylidene bisphenols are especially preferred.

A widely used class of polyepoxides which are useful according to the present invention includes the resinous epoxy polyethers obtained by reacting an epihalohydrin, such as epichlorohydrin, and the like, with either a polyhydric phenol or a polyhydric alcohol. Typically the epoxy resins have an average of at least 1.8 reactive, 1,2-epoxy groups per molecule. An illustrative, but by no means exhaustive, listing of suitable dihydric phenols includes 4,4,-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis-(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like.

Another class of polymeric polyepoxides which can be amine cured and are in accordance with the present invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K., *Handbook of Epoxy Resins,* McGraw Hill Book Co., New York, 1967.

The polyamine curing agents which can be utilized in accordance with the instant invention are generally any of those polyamine curing agents which are well-known to be useful for the curing of vicinal epoxides. Generally, those curing agents having at least three reactive amino hydrogens are useful.

Exemplary of those amines which can be utilized are alkylene polyamines such as diethylene triamine, triethylene tetramine and the like, oxyalkylene polyamines such as polyoxypropylene, di- and triamine and 1,13-diamino 4,7,10-trioxatridecane.

Additionally, aromatic amine curing agents are useful, such as the alkylene-linked polyphenyl amines, phenylene diamines and polycyclic or fused aromatic primary amine compounds. Additionally, the corresponding cycloaliphatic compounds can be used.

Likewise, the polyamide curing agents such as the condensation products of polyamines and polycarboxylic acids are useful. Suitable such amide compounds are, for example, the condensation product of a polyamine and a dimerized fatty acid produced in accordance with U.S. Pat. No. 2,379,413.

Of the amine curing agents known to be effective in curing a vicinal epoxy resin, preferred curing agents in accordance with the instant invention are the polyoxyalkylene containing amine compounds. A preferred class of polyoxyalkylene polyamines is depicted by the formula:

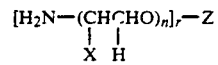

wherein X is hydrogen, a methyl radical or an ethyl radical; Z is a hydrocarbon radical having 2 to 5 carbon atoms forming from 2 to 4 external ether linkages; n is a number from 1 to about 15 and r is a number from 2 to 4. The most preferred polyoxyalkylene polyamines are the polyoxypropylene diamines wherein X is a methyl radical, n is a number from 1 to 10, Z is a 1,2-propylene radical and r is about 2. These polyoxyalkylene polyamines can be prepared by known methods as disclosed in U.S. Pat. Nos. 3,236,895 and 4,654,370. The most preferred polyoxyalkylene polyamine is a polyoxypropylene diamine having a molecular weight of about 230.

Another preferred class of polyoxyalkylene polyamines can be depicted by the formula:

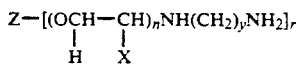

wherein X, Z, n and r are defined above and y is 2 or 3. These poly(aminoalkylamino)polyethers are the hydrogenated product of the cyanoalkylated adduct of a polyoxyalkylene polyamine as described. The preparation of the cyanoalkylated adducts is described in U.S. Pat. No. 3,666,788 to Rowton.

Examples of preferred alkanolamines useful in the invention include mono-, di- and triethanolamine, hydroxy ethoxyethylamine, N-aminoethylethanolamine, N,N-bis(hydroxypropyl), N-hydroxyethylamine and the like.

U.S. Pat. No. 3,654,370 to Yeakey incorporated herein by reference describes a process for preparing polyoxyalkylene polyamines of the formula:

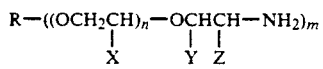

wherein R is the nucleus of an oxyalkylation susceptible polyhydric alcohol containing 2 to 12 carbon atoms and 2 to 8 hydroxyl groups, Z is an alkyl group containing 1 to 18 carbon atoms, X and Y are hydrogen or Z, n has an average value of 0 to 50 and m is an integer of 2 to 8 corresponding to the number of hydroxyl groups in the polyhydric alcohol.

The hindered polyetherpolyamine adhesion enhancer is an aminated, alkyl capped polyol of molecular weight equal to or greater than 2000, preferably a molecular weight of 3000 to 5000. This adhesion enhancer comprises polyetherpolyamines which have been hindered by capping the polyol with a long chain alkyl epoxide group prior to amination gives a hindered polyamine. The long chain alkyl group provides steric hindrance to the primary aliphatic amine. This steric hindrance slows down the reactivity of the amine with the vicinal polyepoxide. The slower reactivity of the amine group is useful since it allows for longer flow times in forming epoxy laminates or coatings.

The hindered amines of the present invention may be made according to the following reaction scheme:

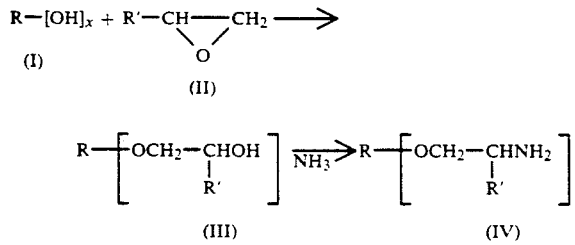

Compound (I) is a polyol and may be any of the commonly used polyols in polyamine curative synthesis, as will be further described below. In a preferred embodiment of the invention, polyol (I) has already been alkoxylated with ethylene oxide, propylene oxide, butylene oxide or mixtures thereof in block or mixed fashion, according to procedures well known in the art. The moiety R represents the initiator center of the polyamine, and may contain the above-described alkoxylation. The initiator center is that left after the reaction of the initiator with the alkylene oxides. The alkoxylated branches of the polyol (I) will terminate in hydroxyl groups. The number of hydroxyl terminations, designated by x should be at least two, preferably from 2 to 8, most preferably from about 2 to about 6.

The long chain alkyl epoxide (II) has a straight or branched alkyl group R' of at least 10 carbon atoms, preferably from about 10 to 20 carbon atoms, most preferably from about 10 to 16 carbon atoms. In one embodiment, at least one mole of long chain alkyl epoxide (II) is reacted per hydroxyl group present on the polyol (I) to give alkoxylated polyol intermediate (III) which is in turn aminated to give the final hindered polyetherpolyamine (IV). In another embodiment, less than all the hydroxyl groups may be reacted with an equivalent of long chain alkyl epoxide. Somewhat more explicitly, if the prior alkoxylations are represented, the hindered polyetherpolyamine may have the structure (V):

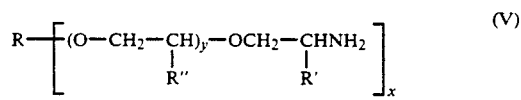

where R, R', and x are as defined above, R" is an alkyl group of one or two carbon atoms and y ranges from about 20 to about 80. In the embodiment where less than all the hydroxyl groups are reacted with an equivalent of long chain alkyl epoxide, compounds (IV) and (V) are partially hindered. In this event, at least one of the R' on the resulting molecule is a straight or branched alkyl group of at least 10 carbon atoms, preferably from about 10 to 20 carbon atoms (most preferably 10 to 16 carbon atoms) and the remaining R' groups are hydrogen, methyl or ethyl. In one embodiment, at least half the R' groups are straight or branched alkyl groups of at least 10 carbon atoms.

The capping of the alkoxylated polyol (I) may be achieved at a temperature in the range from about 100° C. to about 150° C. without a catalyst. A catalyst may be present and is preferably an alkali metal hydroxide. There is often enough catalyst remaining from the alkoxylation reactions to catalyze the capping. While it is contemplated that substantially all of the hydroxyl groups are capped with the long chain alkyl epoxide, it will be appreciated that a smaller percentage of hydroxyl groups may be reacted with the long chain alkyl epoxide to give only a partially hindered polyetherpolyamine, as described above. At least enough hydroxyl groups should be capped to slow down the reactivity of the polyetherpolyamine as compared with the unhindered version of the same amine; this percentage will be called an effective amount herein. In one embodiment of the invention it is preferred that from 20 to 100% of the hydroxyl groups will be capped with the long chain alkyl epoxide, where a preferred range is from 50 to about 100%. It will be appreciated that the steric hindrance of the R' group next to the primary amine will reduce its activity somewhat. The slower reactivity of the amine group is useful in forming laminates or coatings since it allows for longer application time.

The polyhydric alcohols which can be used as initiators for reaction with alkylene oxide, long chain alkyl epoxide and ammonia to provide the hindered polyetherpolyamines of the present invention include, but are not limited to, ethylene glycol; propylene glycols; butylene glycols; pentane diols; bis(4-hydroxycyclohexyl)dimethylmethane; 1,4-dimethylolbenzene; glycerol; 2,3,6-hexanetriol; trimethylolpropane; mannitol; sorbitol; erythritol; pentaerythritol; their dimers, trimers and higher polymers, e.g. polyethylene glycols; polypropylene glycols; triglycerol; dipentaerythritol and the like polyallyl alcohol, polyhydric thioethers, etc. Meeting the definition of the hindered polyetherpolyamines used in this invention ar hindered polyfunctional JEFFAMINE ® amines. JEFFAMINE ® amines are made by Texaco Chemical Company and their polyoxyalkylene glycol precursors may be modified to hindered versions by capping them with the long chain alkyl epoxide prior to the amination step. The precursor polyoxyalkylene glycols for JEFFAMINE ® D-2000 and T-5000 amines are examples of JEFFAMINE ® amines which may be hindered to provide modified polyetherpolyamines which will give longer flow times when reacted with polyisocyanates. The alkoxylated initiators useful in the process of this invention preferably have a molecular weight of about 2000 or more.

The amine cured resins having superior adhesion in accordance with the instant invention are prepared in a conventional manner. The amine curing agent combination is admixed with the polyepoxide composition in amounts according to the amine equivalent weight of the curing agent combination employed. Generally, the number of equivalents of amine groups is from about 0.8 to about 1.2 times the number of epoxide equivalents present in the curable epoxy resin composition, with a stoichiometric amount being preferred. In the instant invention about 2 to 30 parts of the adhesion enhancer are added to the polyamine curing agent to formulate the curative component. When an accelerator is used, amounts from 1 to about 15 parts by weight based on 100 parts by weight of the resin are generally satisfactory. The exact amount of constituents in accordance with the above general requirements will depend primarily on the application for which the cured resin is intended.

Generally, the mixture of epoxy resin, the polyamine curing agent, hindered polyetheramine adhesion enhancer and the accelerator combination is allowed to self-cure at ambient temperatures of between 0° C. to about 45° C. Excellent adhesive properties are developed at room temperature of about 25° C.

According to a greatly preferred embodiment, resins of the polyglycidyl ether of polyhydric phenol type are cured with a stoichiometric amount of di- or triamines, the adhesion enhancer hindered polyetherpolyamine diamine and from 1 to 10 parts by wt % based on 100 parts by weight of the resin of an accelerator comprising an admixture of piperazine, N-aminoethylpiperazine and triethanolamine. The composition is cured at room temperature to produce product having superior adhesive strength in accordance with the instant invention.

It will further be realized that various conveniently employed additives can be admixed with the adhesive composition prior to final cure. For example, pigments, dyes, fillers, flame retarding agents and the like may be added to produce a custom formulation for a particular end use.

Furthermore, although not preferred, known solvents for polyepoxide, materials such as toluene, benzene, xylene, dioxane, ethylene glycol monomethyl-ether and the like can be used to aid their application to flat or curved surfaces in thin films. Polyepoxide resins containing the additives can be used in any of the applications for which polyepoxides are customarily used. The compositions of the instant invention can be used in their Best Mode as adhesives.

The formulations effective in bringing about the increased adhesion and peel strength properties were discovered empirically as demonstrated in the example.

The following examples illustrate the nature of the instant invention but are not intended to be limitative thereof.

EXAMPLE 1
Adhesion Properties:
Epoxy Resin System Cured With
Polyoxyalkylenediamine (JEFFAMINE ® EDR-148)
with Aminated $C_{16}$-capped Polyol (Totally Capped)

|  | 6772-29A | 29B | −29C | −29D | −29E |
|---|---|---|---|---|---|
| Formulation: |  |  |  |  |  |
| Liquid epoxy resin (Bisphenol A) (EEW 185–192) | 100 | 100 | 100 | 100 | 100 |
| JEFFAMINE ® EDR-148 | 20 | 20 | 20 | 20 | 20 |
| Accelerator 399 | 5 | 5 | 5 | 5 | 5 |
| Aminated $C_{16}$-Capped Polyol[1] | — | 1 | 2 | 2 | 10 |
| Adhesion Properties:[2] |  |  |  |  |  |
| Tensile Shear strength, psi | 1200 | 1400 | 1400 | 1400 | 1800 |
| T-peel strength, pli | 2.4 | 2.3 | 2.7 | 6.6 | 6.9 |

[1]Polyol (MW ~ 3000) totally capped prior to amination (Polyol from example 5)
[2]Bond: Al—to—Al; cured 7 days, ~23°·C.
Addition of an aminated $C_{16}$-capped polyol (~3000 MW) resulted in an enhancement of adhesive properties. Peel strength was particularly enhanced with increased amounts of modified polyol added in the formulation.

EXAMPLE 2
Adhesion Properties:
Epoxy Resin System Cured With
Polyoxyalkylenediamine (Jeffamine ® EDR-148)
with Aminated $C_{16}$-capped Polyol (Partially Capped)

|  | 6772-29A | 30A | −30B | −30C | −30D |
|---|---|---|---|---|---|
| Formulation: |  |  |  |  |  |
| Liquid epoxy resin (EEW 185–192) | 100 | 100 | 100 | 100 | 100 |
| JEFFAMINE ® EDR-148 | 20 | 20 | 20 | 20 | 20 |
| Accelerator 399 | 5 | 5 | 5 | 5 | 5 |
| Aminated $C_{16}$-Capped (Partially) Polyol[1] | — | 1 | 2 | 5 | 10 |
| Adhesion Properties:[2] |  |  |  |  |  |
| Tensile Shear strength, psi | 1200 | 1600 | 1300 | 2600 | 5000 |
| T-peel strength, pli | 2.4 | 1.6 | 1.2 | 2.0 | 4.5 |

[1]Polyol (MW ~ 5000) partially capped prior to amination (Polyol from example 7)
[2]Bond: Al—to—Al; cured 7 days, ~23° C.
Improvements in adhesion properties were noted with added amounts of modified polyol. In this example, more improvement was noted in tensile shear strength than with peel strength. However, significant improvement was noted with both properties.

EXAMPLE 3
Adhesion Properties:
Epoxy Resin System Cured With
Polyoxyalkylenediamine (Jeffamine ® D-230)
with Aminated $C_{16}$-capped Polyol (Totally Capped)

|  | 6772-92A | 92B | −92C | −92D | −92E |
|---|---|---|---|---|---|
| Formulation: |  |  |  |  |  |
| Liquid epoxy resin (EEW 185–192) | 100 | 100 | 100 | 100 | 100 |
| JEFFAMINE ® | 32 | 32 | 32 | 32 | 32 |

EXAMPLE 3
Adhesion Properties:
Epoxy Resin System Cured With
Polyoxyalkylenediamine (Jeffamine ® D-230)
with Aminated C<sub>16</sub>-capped Polyol (Totally Capped)

| | 6772-92A | 92B | −92C | −92D | −92E |
|---|---|---|---|---|---|
| D-230 | | | | | |
| Accelerator 399 | 10 | 10 | 10 | 10 | 10 |
| Aminated C<sub>16</sub>- Capped Polyol(1) | — | 2 | 5 | 10 | 20 |
| Adhesion Properties:(2) | | | | | |
| Tensile Shear strength, psi | 1200 | 1500 | 2700 | 3100 | 3600 |
| T-peel strength, pli | 3.1 | 6.2 | 4.6 | 10.2 | 16.5 |

(1) Polyol (MW ~ 3000) totally capped prior to amination (Polyol from example 5)
(2) Bond: Al—to—Al; cured 7 days, ~23° C.
Adhesion properties were considerably enhanced with addition of small amounts of modified polyol

EXAMPLE 4
Adhesion Properties:
Epoxy Resin System Cured With
Polyoxyethylenediamine (JEFFAMINE ® D-230)
with Aminated C<sub>16</sub>-capped Polyol (Partially Capped)

| | 6772-92A | 93A | −93B | −93C | −93D |
|---|---|---|---|---|---|
| Formulation: | | | | | |
| Liquid epoxy resin (EEW 185-192) | 100 | 100 | 100 | 100 | 100 |
| JEFFAMINE ® D-230 | 32 | 32 | 32 | 32 | 32 |
| Accelerator 399 | 10 | 10 | 10 | 10 | 10 |
| Aminated C<sub>16</sub>-Capped (Partially) Polyol(1) | — | 2 | 5 | 10 | 20 |
| Adhesion Properties:(2) | | | | | |
| Tensile Shear strength, psi | 1200 | 1600 | 1400 | 2700 | 3000 |
| T-peel strength, pli | 3.1 | 4.8 | 7.6 | 17.9 | 26.7 |

(1) Polyol (MW ~ 5000) partially capped prior to amination (Polyol from example 7)
(2) Bond: Al—to—Al; cured 7 days, ~23° C.
Improvements in adhesion properties were noted with added amounts of modified polyol. In this example, more improvement was noted in tensile shear strength than with peel strength. However, significant improvement was noted with both properties.

This example demonstrates the preparation of a 3000 m.w., glycerin-based triol which was capped with three moles of a C<sub>16</sub> olefin oxide (Vikalox ® 16).

Fifteen pounds of a 610 m.w. propylene oxide adduct of glycerin (alkalinity, mg KOH/g 1.7, hydroxyl no. corr., mg KOH/g 25) and 196 g 45% potassium hydroxide were charged to a ten-gallon kettle. The reactor was purged with nitrogen. The reactor was next heated to 105° C. with nitrogen purge and the initiator dried to a water content of 0.06% using both vacuum and nitrogen stripping. Propylene oxide (38.3 lb) was then added at 105°-110° C. at 50 psig over a three hour period. The reaction mixture was digested to an equilibrium pressure and purged with nitrogen for 30 minutes. Vikalox ® 16 olefin oxide (16.9 lb) was then added at 110°-115° C. at the rate of 8.0 lb/hr. The reaction mixture was then digested three hours at 125° C. The alkaline product was neutralized at 95° C. by stirring two hours with 1150 g Magnesol ® 30/40 adsorbent added as an aqueous slurry. Di-t-butyl-p-cresol (15.9 g) was then added to stabilize the product. The neutralized product was vacuum striped to a minimum pressure, nitrogen stripped, and filtered. Properties of the finished product were as follows:

| Properties | |
|---|---|
| Alkalinity, mg KOH/g | 0.005 |
| Hydroxyl no. mg KOH/g | 57.7 |
| Water, wt % | 0.076 |
| pH in 10:6 isopropanol:water | 7.4 |
| Color, Pt—Co | Opaque liquid |
| Sodium, ppm | 0.8 |
| Potassium, ppm | 11.8 |
| Viscosity, | |
| 77° F. | 565 cs |
| 100° F. | 209 cs |

EXAMPLE 6

A 3000 molecular weight polyol from example 5 that had been capped with a C<sub>16</sub> alkylene oxide, ammonia and hydrogen were fed to a tubular reactor filled with nickel amination catalyst.

| Reactor Conditions | |
|---|---|
| Polyol feed rate, lb/hr | 0.80 |
| Ammonia feed rate, lb/hr | 0.80 |
| Hydrogen feed rate, l/hr. @0° C., 1 atm. | 48 |
| Temperature, °C. | 210 |
| Reactor Volume, cc. | 1250 |

The crude reactor effluent was placed in a clean dry kettle and nitrogen stripped to 70° C., then placed under 10 mm Hg vacuum and heated to 100° C. It was held at these conditions for 1 hour. The product had the following analysis:

| Total Acetylatables | 1.09 meq/g |
|---|---|
| Total Amine | 0.975 meq/g |
| Primary Amine | 0.967 meq/g |

EXAMPLE 7

This example demonstrates the preparation of a 5000 m.w. glycerin-initiated triol which was terminated with 1.5 moles Vikalox ® 16 olefin oxide.

Ten pounds of a 700 m.w. propylene oxide adduct of glycerin (alkalinity, mg KOH/g 26, hydroxyl no., corr., mg KOH/g 238) and 40.4 g 45% potassium hydroxide were charged to a ten-gallon kettle. The reactor was purged with nitrogen. Maintaining a nitrogen purge, the reactor was heated to 110° C. and the initiator dried to a water content of 0.09% using both vacuum and nitrogen stripping. Propylene oxide (73.2 lb) was then reacted at 110°-115° C. at 50 psig over a five-hour period. The reaction mixture was then digested to equilibrium pressure and pu.ged with nitrogen for 30 minutes. Vikalox ® 16 olefin oxide (5.4 lb) was then reacted at the rate of 8.0 lb/hr at 110°-15° C. The reaction mixture was then digested at 125° C. for three hours. The alkaline product was neutralized at 95° C. by stirring two hours with 110 g Magnesol ® 30/40 adsorbent which was added as an aqueous slurry. Di-t-butyl p-cresol (20 g) was then added to stabilize the polyol. The neutralized product was vacuum stripped to a minimum pressure, nitrogen stripped, and filtered. Properties of the finished product were as follows:

| Properties | |
|---|---|
| Acid no. mg KOH/g | 0.004 |

| Properties | |
|---|---|
| Hydroxyl no. mg KOH/g | 36.3 |
| Water, wt % | 0.02 |
| pH in 10:6 isopropanol:water | 7.28 |
| Color, Pt—Co | Hazy liquid |
| Sodium, ppm | 0.7 |
| Potassium, ppm | 1.2 |
| Viscosity, °F., cs | |
| 77 | 792 |
| 100 | 396 |

EXAMPLE 8

A 5000 molecular weight triol from example 7 partially capped with a $C_{16}$ olefin oxide, ammonia and hydrogen were fed to a continuous reactor filled with nickel amination catalyst. The reaction conditions were:

| | |
|---|---|
| Polyol feed rate, lb/hr | 0.50 |
| Ammonia feed rate, lb/hr | 0.50 |
| Hydrogen, 1/hr @0° C., 1 atm. | 35 |
| Temperature, °C. | 215 |
| Reactor volume, cc | 1250 |

The reactor effluent was charged to a clean dry kettle with nitrogen stripping. It was then placed under 6 mm Hg vacuum and heated to 100° C. for 1 hour. The product had the following analysis:

| | |
|---|---|
| Total acetylatables | 0.68 meq/g |
| Total amine | 0.622 meq/g |
| Primary amine | 0.615 meq/g |

| TABLE OF TEST METHODS | |
|---|---|
| T-peel strength (pli) | ASTM D-1876 |
| Tensile shear strength (psi) | ASTM D-1002 |

TABLE OF MATERIALS

Nickel amination catalyst according to U.S. Pat. No. 3,654,370 to E. L. Yeakey incorporated herein by reference.

JEFFAMINE ® D-230, D-400 and D-2000 are represented by the structure:

$$H_2NCH(CH_3)CH_2-[OCH_2CH(CH_3)]_xNH_2$$

| wherein: | JEFFAMINE ® | X (approx.) |
|---|---|---|
| | D-2000 | 33.1 |
| | D-400 | 5.6 |
| | D-230 | 2.6 |

JEFFAMINE ® T-403 is represented by the structure:

$$\begin{array}{c} CH_2[OCH_2CH(CH_3)]_xNH_2 \\ | \\ CH_3CH_2-C-CH_2[OCH_2CH(CH_3)]_yNH_2 \\ | \\ CH_2[OCH_2CH(CH_3)]_zNH_2 \end{array}$$

wherein $x + y + z$ ranges from 3 to 6.

The use of these amines as epoxy resin curing agents is described in U.S. Pat. No. 4,189,564.

JEFFAMINE ® T-5000 is a partially aminated polyol having 0.55 meq/g total acetylatables, a total amine content of 0.48 meq/g, and a primary amine content of 0.43 meq/g.

Accelerator 399 is a blend of 0–20% piperazine, 5–10% N-aminoethylpiperazine and 65–80% triethanolamine.

JEFFAMINE ® EDR-148 is triethyleneglycol diamine.

JEFFAMINE ® EDR-192 is tetraethyleneglycol diamine.

While particular embodiments of the invention have been described, it will be understood, of course, that the invention is not limited thereto since many modifications may be made, and it is, therefore, contemplated to cover by the appended claims any such modification as fall within the true spirit and scope of the invention.

What is claimed is:

1. An epoxy resin composition comprising the cured reaction product of:
   A. an epoxy resin component comprising a vicinal polyepoxide having an average of at least 1.8 reactive 1,2-epoxy groups per molecule;
   B. a curative component comprising a curing amount of:
      1. a polyamine curing agent selected from the group consisting of polyamines of the formulae:

$$H_2NCH(CH_3)CH_2-[OCH_2CH(CH_3)]_xNH_2$$

wherein: x ranges from 2 to 40, and $$\begin{array}{c} CH_2[OCH_2CH(CH_3)]_bNH_2 \\ | \\ CH_3CH_2-C-CH_2[OCH_2CH(CH_3)]_cNH_2 \\ | \\ CH_2[OCH_2CH(CH_3)]_dNH_2 \end{array}$$

wherein the sum of b, c and d ranges from 3 to 6; and
      2. 2 to 30 parts by weight per hundred parts vicinal polyepoxide of a hindered polyetherpolyamine adhesion enhancer prepared by the steps of:
   i. reacting a polyol having two or more hydroxyl groups with an effective amount of a $C_{10}$ or greater alkyl monoepoxide to give an at least partially hindered intermediate having hydroxyl terminations; and
   ii. aminating at least some of the hydroxyl terminations on the intermediate to primary amine groups to give an at least partially hindered polyetherpolyamine.

2. The composition of claim 1 where the polyol is reacted with an alkylene oxide selected from the group consisting of ethylene oxide, propylene oxide, butylene oxide and mixtures thereof prior to reacting the hydroxyl groups with said alkyl mono epoxide prior to the aminating step.

3. The composition of claim 1 where substantially all of the hydroxyl groups of the polyol are reacted with said alkyl mono epoxide.

4. The composition of claim 1 where the hindered polyetherpolyamine has the structure:

$$R-\left[OCH_2-CHNH_2 \atop | \atop R'\right]_x$$

wherein R is the central moiety which results upon removing at least some of the hydroxyl groups from a polyol, at least one R' is a straight or branched alkyl group having at least ten carbon atoms, the balance of R' being hydrogen, methyl or ethyl and x is 2 or more.

5. The composition of claim 1 wherein the adhesion enhancer has a molecular weight of 2000 or greater.

6. The composition of claim 1 wherein the adhesion enhancer has a molecular weight of 3000 to 5000.

* * * * *